A. M. BELDING.
SULKY PLOW AND ATTACHMENT.
APPLICATION FILED DEC. 23, 1907. RENEWED MAR. 11, 1909.
922,246.
Patented May 18, 1909.
2 SHEETS—SHEET 1.
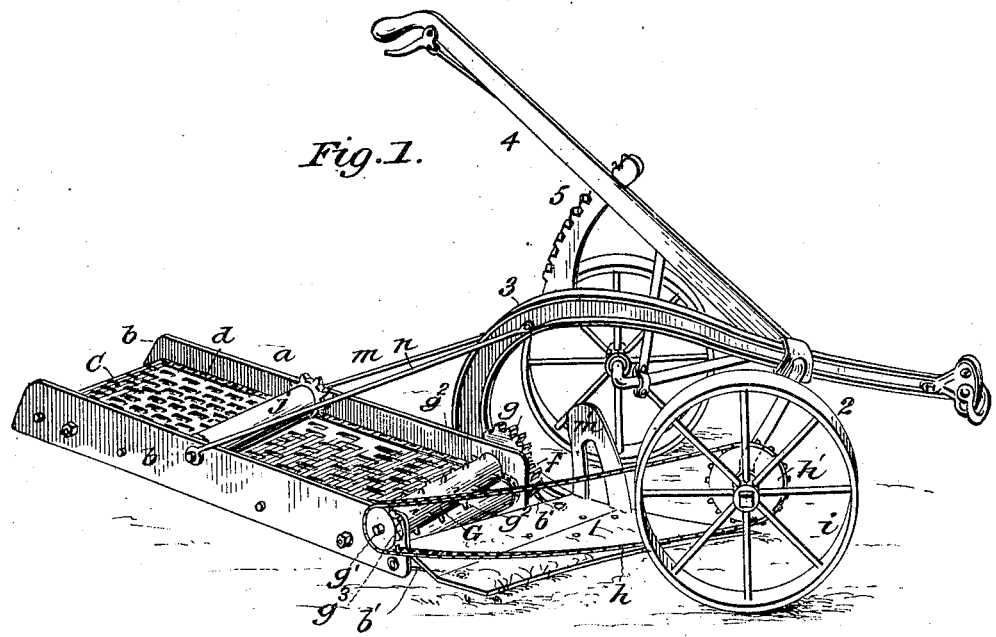
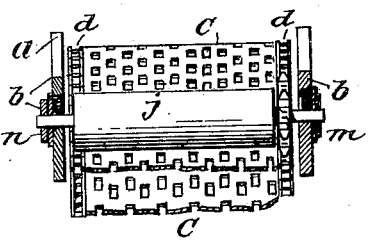
WITNESSES:
John T. Schrott
Charles H. Wagner.
INVENTOR
Austin M. Belding
BY
Fred G. Dieterich & Co
ATTORNEYS A. M. BELDING.
SULKY PLOW AND ATTACHMENT.
APPLICATION FILED DEC. 23, 1907. RENEWED MAR. 11, 1909.

922,246.

Patented May 18, 1909.
2 SHEETS—SHEET 2.

WITNESSES:
John T. Schrott
Charles H. Wagner

INVENTOR
Austin M. Belding
BY
Fred G. Dieterich
ATTORNEYS

UNITED STATES PATENT OFFICE.

AUSTIN M. BELDING, OF OSAKIS, MINNESOTA.

SULKY-PLOW AND ATTACHMENT.

No. 922,246.     Specification of Letters Patent.     Patented May 18, 1909.

Application filed December 23, 1907, Serial No. 407,736. Renewed March 11, 1909. Serial No. 482,831.

*To all whom it may concern:*

Be it known that I, AUSTIN M. BELDING, residing at Osakis, in the county of Douglas and State of Minnesota, have invented a new and Improved Sulky-Plow and Attachments, of which the following is a specification.

My invention is in the nature of an improved means, adapted for being coöperatively combined with the common types of sulky plows, that has for its object to operate on the soil after it is turned and passes from the plow, to take the foul roots, witch grass and the like out of the said soil, leave the cleared soil and discharge the trash weeds, etc. into a suitable receiver.

With the above and other objects in view, my invention comprehends, generally, a receiver that includes an endless screening conveyer, adapted for being connected to the rear or discharging end of the mold board of a sulky plow and geared with the running gear of the plow, means being also operatively connected with the plow and receiver for separating the roots and the like from the soil, and pulverizing the liftings from the plow.

In its more complete nature, my invention embodies in connection with an endless screening receiver and conveyer, means adapted for connection with the mold board of a sulky plow mechanism, that coacts with the receiver and separator for pulverizing and crushing the plow lifted soil and for agitating the screening conveyer whereby to provide for returning the cleared and pulverized soil back to the ground as the trash is carried off.

My invention also consists in certain details of construction and peculiar combination of parts, all of which will be hereinafter fully described, specifically pointed out in the appended claim and illustrated in the accompanying drawings, in which:—

Figure 3:
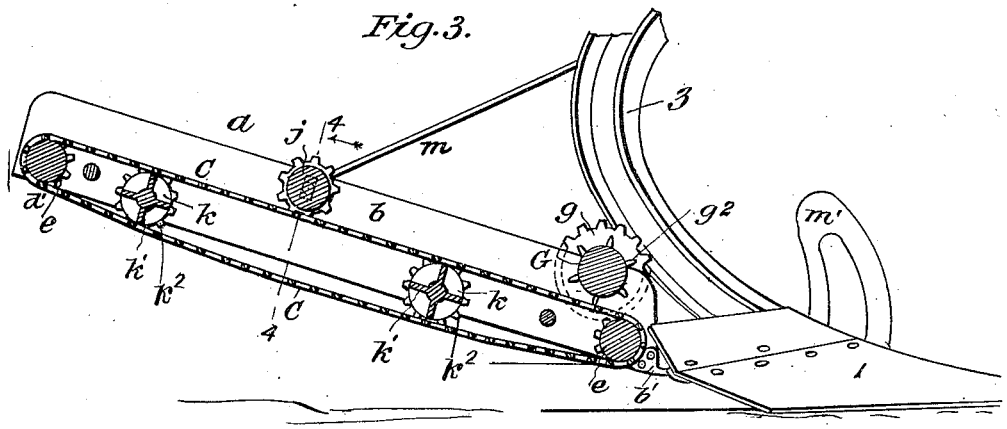
Figure 2:
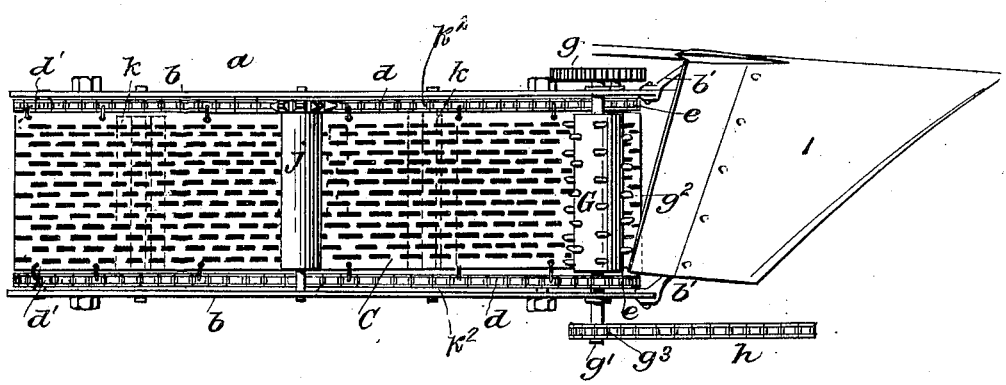

Figure 1, is a perspective view of my invention, the parts being adjusted to a position for use. Fig. 2, is a plan view of the separating and pulverizing devices, so much of the plow and the running gear thereof being shown to illustrate the connection of the said devices therewith. Fig. 3 is a longitudinal section of the separating and pulverizing device, the plow portions being indicated in side elevation. Fig. 4, is a transverse section thereof on the line 4—4 on Fig. 3.

In the practical application of my invention, I combine the separating and pulverizing means with any of the common types of plows, preferably, however, with a plow having a flat mold board, for example, as indicated by 1 in the drawings, in which 2 designates the carriage frame, 3 the beam, and 4 and 5 the plow lift controlling lever and ratchet mechanism, which are of the common form and need not be referred to in detail.

$a$ designates a receiver comprising the oppositely disposed side bars $b$—$b$ that constitute a supporting frame, the lower ends of which have projecting brackets $b'$—$b'$ for detachably connecting the said end to the inner face of the plow land side and the under face of the mold board, the connections being such that when set up for use the receiver, which also acts as an elevator, has its entrant end disposed to receive the turned earth with the weeds, trash and grass lifted therewith. The bottom of the receiver consists of an endless chain canvas conveyer C, that is perforated or otherwise formed to act as a screen, and the said conveyer includes a pair of endless sprocket chains $d$—$d$ that pass over sprocket wheels $e$—$e$ at the front end of the receiver and similar wheels $d'$—$d'$ located at the discharging end of the said receiver. The wheels $e$—$e$ receive motion from a cog gear $f$ that meshes with a gear $g$ on a cross shaft $g'$ that carries a cylinder G having radial teeth or fingers $g^2$ for pulverizing the soil as it passes onto the conveyer C, it also acting as a feeder for carrying the grass, weeds and other trash back onto the conveyer as it is separated from the soil.

Shaft $g'$ has a sprocket wheel $g^3$, around which takes a drive chain $h$ that also takes around a large chain gear $h'$ on one of the sulky wheels $i$ as clearly shown in Figs. 1 and 2.

$j$ designates a rotary crusher, that is journaled in the side members of the receiver and acts to crush the lump of soil that might pass through the pulverizing and separating cylinder. One or more beaters $k$—$k$ are also journaled on the side frame members of the receiver, each of which has a series of radial blades $k'$—$k'$— for striking the flexible endless screening conveyer, whereby to constantly agitate the same to cause it to thoroughly sift or screen the soil and separate it from the trash before the latter is discharged over the rear end of the receiver into a box or other receptacle (not shown).

Beaters $k$—$k$ are driven through the chains $d$—$d$ that pass over the chain wheels $k^2$—$k^2$ on the beater shafts and over a chain wheel on the pulverizer shaft.

$m$ and $n$ designate hanger rods that support the outer end of the soil separating and screening devices from the plow beam, as clearly shown in Fig. 1.

To further provide for breaking up the sod and for directing the plowed soil toward the separating and pulverizing means, a standing cutter blade $m'$ is bolted or otherwise made fast to the plow about midway the mold board as clearly shown in Fig. 1.

From the foregoing, taken in connection with the accompanying drawings, the complete construction, the manner of operation and the advantages of my invention will be readily apparent to those skilled in the art to which it appertains.

By reason of the peculiar construction and combination of parts, the same can be economically manufactured and is capable of being easily attached to any of the ordinary types of sulky plows without the necessity of re-arranging the parts thereof.

Among other advantages, it should be stated, that by the use of my invention, I am enabled to positively take the foul roots and the "quack or witch" grass out of the ground, thresh it, carry the roots off and drop the soil back on the ground where it belongs.

Having thus described my invention, what I claim and desire to secure by Letters Patent, is:—

The combination with a sulky plow frame and a mold board; of an attachment for the purposes stated that comprises a frame consisting of two side members joined to form a support, means for detachably connecting the front end of the said support to the under side of the mold board, another means for suspending the rear end of the frame from the plow standard, a flexible endless conveyer mounted between the side frame members, said conveyer having an endless chain portion at the opposite edges, chain wheels disposed at the ends of the supporting frame that mesh with the endless chain portions of the conveyer, a pulverizer mounted on the frame at the front end of the conveyer, said pulverizer and the conveyer with the endless chain portion being geared with and driven from the gear of the plow sulky axle, and a clod crusher mounted on the frame over the endless conveyer and geared therewith and mechanism actuated from the plow frame for driving the conveying and pulverizing means, as set forth.

AUSTIN M. BELDING.

Witnesses:
 NELS M. EVENSON,
 C. G. MILLARD.